United States Patent [19]

Henderson et al.

[11] Patent Number: 4,697,759
[45] Date of Patent: Oct. 6, 1987

[54] REEL FOR ALIGNING TAPE PATH

[75] Inventors: James J. Henderson; Chester W. Newell, both of San Jose, Calif.

[73] Assignee: Cartrex, Grand Rapids, Mich.

[21] Appl. No.: 859,632

[22] Filed: May 5, 1986

[51] Int. Cl.[4] .......................... G03B 1/04; G11B 15/32
[52] U.S. Cl. .................................... 242/179; 242/192; 242/71.8
[58] Field of Search ............................... 242/197–200, 242/192, 71.8, 77, 118.4, 68.5; 360/93, 132, 96, 105; 226/190, 196, 189, 194

[56] References Cited

U.S. PATENT DOCUMENTS

| 3,508,719 | 4/1970  | Browning       | 242/71.8 |
| 3,545,696 | 12/1970 | Berkey         | 242/71.8 |
| 3,692,255 | 9/1972  | von Behren     | 242/192  |
| 3,829,040 | 8/1974  | Nelson         | 242/199  |
| 4,184,650 | 1/1980  | Nelson et al.  | 242/71.8 |
| 4,335,857 | 6/1982  | Pfost et al.   | 242/192  |
| 4,523,727 | 6/1985  | Morioka        | 242/71.8 X |
| 4,561,609 | 12/1985 | Collins et al. | 242/192  |

FOREIGN PATENT DOCUMENTS 2009101  6/1979  United Kingdom ............... 242/71.8

Primary Examiner—Stuart S. Levy
Assistant Examiner—David Werner

[57] ABSTRACT

Tape path stabilization apparatus for establishing vertical tape alignment from a base with respect to a transducer featuring an axially floating, radially symmetric crown pulley and a tape reel with a downwardly extending annular outrigger rib or boss maintaining contact with the base. The crown pulley will chase tape which loses alignment, tending to center the tape at the peak of the crown. The reel with the annular outrigger will feed or receive tape in a desired vertical height, tending to limit the extent of motion of the floating crown pulley, tending to center the pulley in its range of motion.

7 Claims, 5 Drawing Figures

REEL FOR ALIGNING TAPE PATH

TECHNICAL FIELD

The invention relates to web transport systems and in particular to a reel for guiding tape along a prescribed path.

BACKGROUND ART

The general problem of maintaining tape, such as magnetic tape, along a desired path, while minimizing transverse tension and edge forces is described in the introduction to U.S. Pat. No. 4,335,857. In summary, it is difficult to maintain vertical tape registration relative to a base over a tape path extending from a supply reel to a transducer and then to a take-up reel. Guides which are interposed along the tape path tend to contact tape edges of vertically misaligned tape, causing fatigue of the tape binder material and creating oxide debris which accumulates on the tape, causing data errors.

Part of the problem of tape misalignment from a vertical plane can be traced to supply and take-up reels. Such reels are sometimes mounted on pins which are slightly tilted with respect to the perpendicular angle from a planar base plate. Such tilted pins cause the tape reel to be similarly tilted, possible causing tape misalignment along the tape path. In addition, when the extremeties of the shaft become worn, the reel will wobble to a greater and greater extent. An object of the invention was to correct reel alignment and hence tape alignment.

SUMMARY OF THE INVENTION

The above object has been met by providing a reel whose plane of rotation with respect to the planar base plate is constrained by the reel construction. The reel has a central hub which defines an axial passageway in the usual way. The cylindrical body portion surrounding the hub features an annular outrigger rib or boss coaxial with the hub and extending slightly below the cylindrical body portion between the hub and an outer peripheral surface of the hub.

The axial passageway of the hub fits over an upright pin in a planar base intended to support the tape reel as well as other components which define the tape path. A spring clip placed over the reel and supported by the pin exerts downward force on the reel, forcing the annular outrigger to maintain contact with the base. So long as the outrigger rib or boss maintains contact, tape coming off of the reel should be directed in a plane parallel to the base and not misaligned.

Vertical registration of the tape in its path is promoted by a crown pulley with a convex or concave arcuate profile. The pulley is adapted for up and down axial motion which corrects for vertical misregistration of tape relative to a desired path on which the crown pulley centers the tape. The vertically fixed position of the reel relative to the pulley limits the vertical extent to which the pulley can move and hence the pulley stays within a range of motion where its corrective action can be effective. Without the outrigger reel, the crown pulley might tend to stay at an extreme upper or lower position, especially where a supply reel was feeding tape at an opposite position. By limiting the tilt of the supply reel, the range of motion of the crown pulley is also limited.

The present invention prevents tape edges from excessive contact with edge guides, often found on tape guiding posts. The present invention avoids tape edge contact which causes the deleterious wear and data errors mentioned above.

BEST MODE FOR CARRYING OUT THE INVENTION

Figure 1:
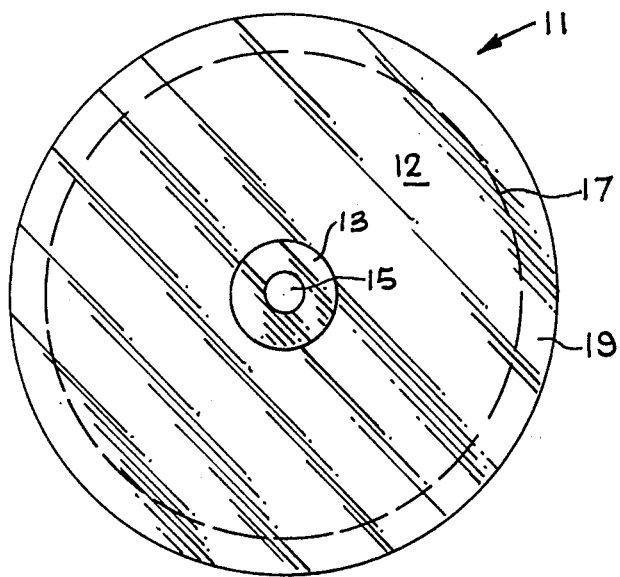
FIG. 1 is a top view of a tape reel employed in the apparatus of the present invention.

With reference to FIG. 1, the tape reel 11 has a central hub 13 with an axial passageway 15 extending therethrough. The hub is a solid cylindrical core of the reel with a diameter of about 0.31 inches. The axial passageway has a diameter sufficient for accommodating an upright pin extending from a base. The pin is an axle on which the reel rotates in wheel and axle relation. The outer peripheral tape support surface, on which a tape pack is formed, is indicated by the dashed line 17. This surface is a portion of the main body of the reel. An overhanging flange portion 19, one of two spaced apart flange portions, promotes the formation of a tape pack. A top surface 12 is coplanar with the flange portions and is solid. The overall diameter of the reel, including opposed flange portions is approximately 1.75 inches, while the diameter of the axial passageway 15 is approximately 0.125 inches. The reel is typically injection moded using a rigid, tough polymer, although other materials may be used, as well as other manufacturing methods.

Figure 2:
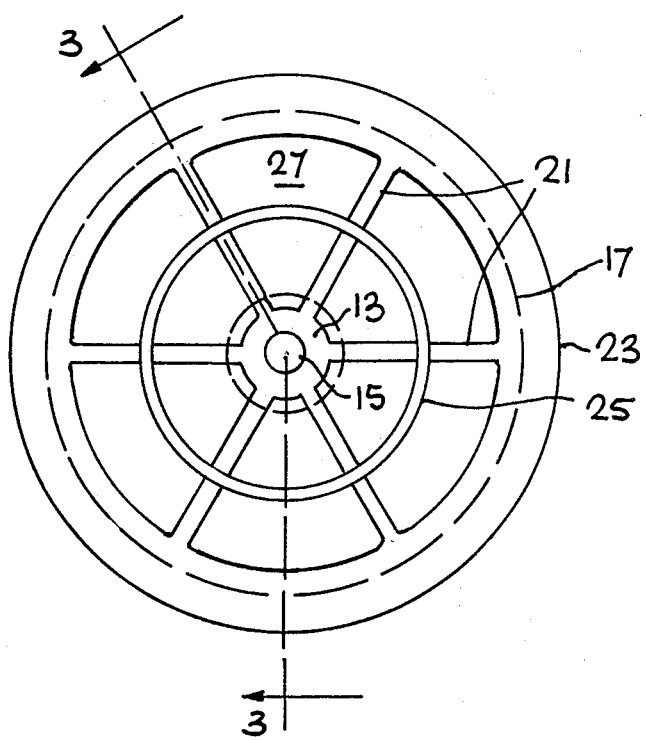
FIG. 2 is a bottom view of the reel shown in FIG. 1.

In FIG. 2, the underside of the reel may be seen to include a plurality of radially extending ribs 21, providing strength to the main body portion of the wheel while achieving low mass for the reel. The ribs extend from hub 13 to the inner peripheral boundary of flange portion 23, overhanging the tape support surface 17.

A novel feature of the present invention is the annular outrigger 25, a circular rib, which is coaxial with hub 13, but extends outwardly from the body portion of the tape reel for contact with a base. The contact surface of the annular outrigger 25 is flat and maintains the axial passageway 15 in a generally perpendicular orientation relative to the base on which the reel is disposed. Deviation from perpendicularity should not exceed a controlled maximum amount, say a few one-thousandths of one inch, e.g. 0.004 inches. Spaces 27 between ribs 21 are generally hollow, but may be filled if desired. The ribs extend as far as an upper surface of the tape reel.

Figure 3:
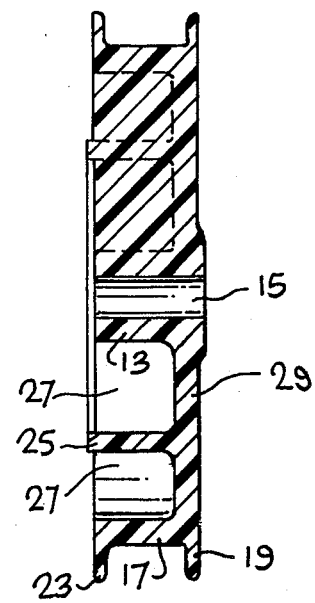
FIG. 3 is a sectional view taken along lines 3—3 of FIG. 2.

The upper surface 29 is illustrated in FIG. 3 and may be seen to span one side of the tape reel, except for the axial passageway 15. The flange portion 19 may be seen overhanging tape support surface 17 on the same side of the reel as upper surface 29 and is an integral part of the upper surface. The annular outrigger 25 is seen to project outwardly beyond the plane defined by the annular flange portion 23 of the bottom side of the reel by only a small distance, such as 0.5 mm. This distance is not critical, but should be such that only the annular outrigger of a tape body contacts a supporting base.

Hollow regions 27 may be seen between the tape support surface 17 and the central hub 13.

Figure 4:
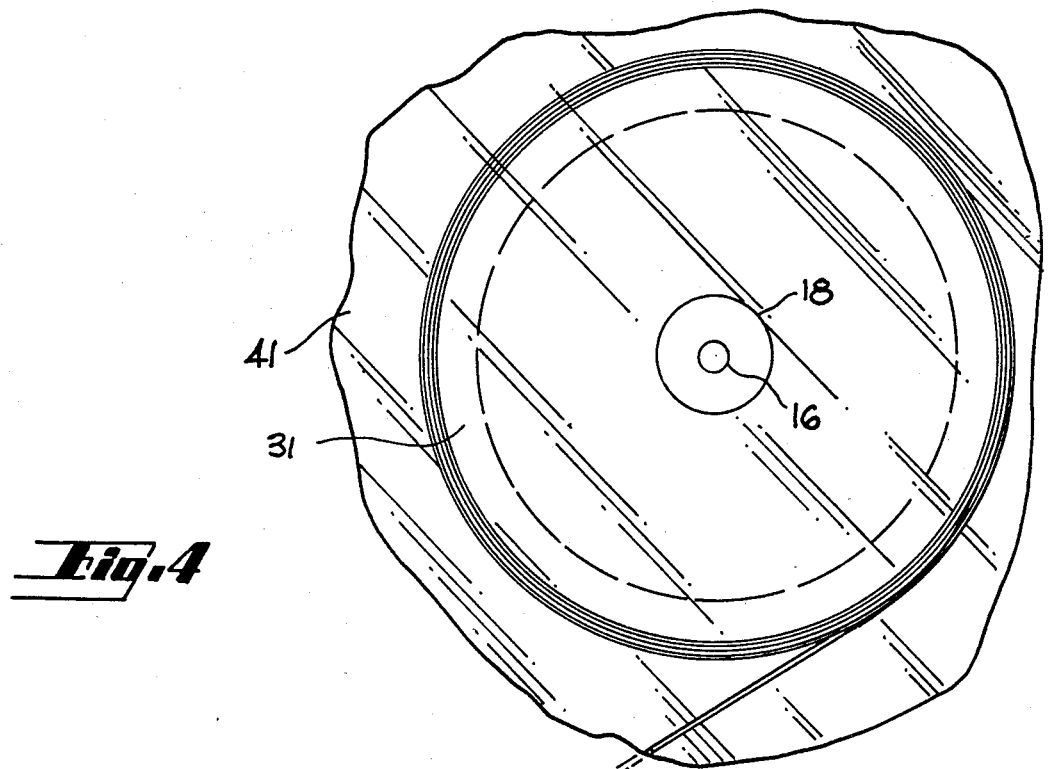
FIG. 4 is a top view of the apparatus of the present invention, including a tape reel and a crown pulley assembly with a tape path therebetween.

FIG. 4 shows a tape path extending from a tape reel 31 and thence to a fixed post 33, a radially symmetric, axially floating, crown pulley 35, having a convex arcuate profile for achieving vertical registration of the tape over its path with respect to a transducer, e.g. of the type used for magnetically reading or writing information with respect to the tape. Reel 31 is mounted with its axial passageway over a steel pin 16 which is perpendicular to base 41. The pin extends slightly above the reel with a retainer clip 18 preventing upward motion of the reel on the pin 16. The retainer clip 18 may be considered a means associated with pin 16 for urging the annular outrigger 25 of FIGS. 2 and 3 to remain in contact with base 41. Retainer clip 18 may be a passive restraint or a spring member actively urging the tape reel downwards. Both situations are referred to as means for urging the outrigger to remain in contact with the base as the reel rotates. The term "outrigger" is intended to encompass a rib or a boss or any annular projection from the reel.

The crown pulley has a surface curvature characterized by a radius of curvature in the range of four to six inches. From the crown pulley 35 the tape path extends toward the fixed flanged guide 37 and then continues on toward the transducer. The crown pulley is axially mounted on a shaft 39, a fraction of an inch longer than the pulley itself, in a manner allowing for up and down motion of the pulley on the shaft, i.e. vertically floating. A flange 45 at the top of the shaft limits upwards crown pulley motion. A well 42 extending into base 41 receives the crown pulley and defines its lowest extent of travel, a slight distance into the base. This up and down motion tends to center the tape about the greatest diameter of the pulley, thereby providing a desired vertical registration of the tape so that it will pass the remote transducer at a desired elevation. The crown pulley may be convex or concave, as is shown in U.S. Pat. No. 4,335,857. However, to keep the pulley within its effective range of corrective action, the annular outrigger of reel 31 is provided to work in cooperative relation with the crown pulley. A planar base 41 provides a support surface for the annular outrigger. Since the plane of the outermost sections of the outrigger are also planar, the perpendicular axial passageway 15, extending through the reel is perpendicular to the base.

Figure 5:
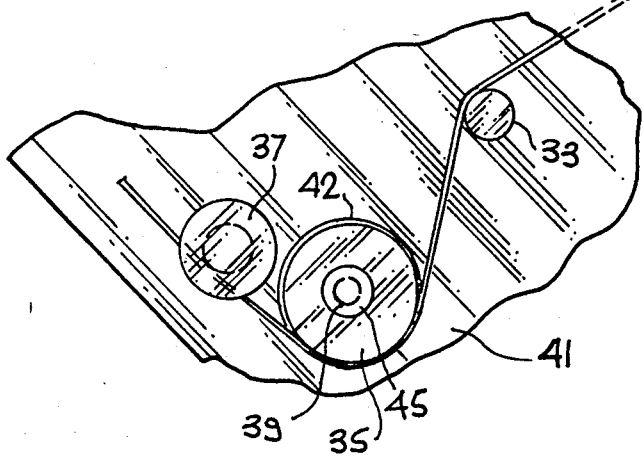
FIG. 5 is a perspective detail of the crown pulley assembly shown in FIG. 4.
Figure 5:
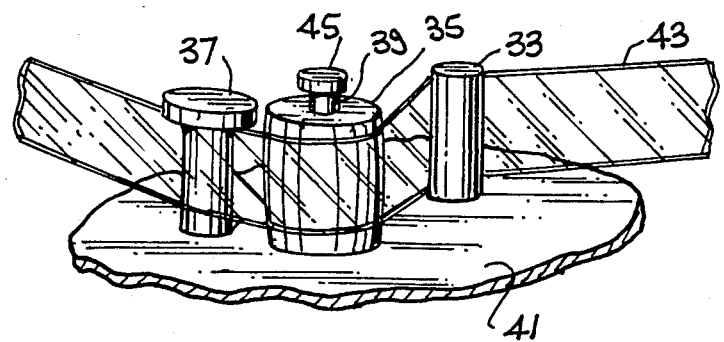

In FIG. 5, the same base 41 allow tape 43 to be spaced above the surface of the base for edge clearance and be trained about the tape turning guide 33 which may either be a fixed or rotating post. In the illustration of FIG. 5, the tape fixed post 33 is seen to be an upright member, fixed in place, perpendicular to the base. The crown pulley 35 has a convex shaped outer surface. Tape 43 will tend to be centered over its greatest diameter in a well understood manner.

Since the crown pulley 35 can move axially, the pulley will chase a tape which is out of alignment as tape delivered from a roll moves past the crown pulley. However, the crown pulley 35 will tend to be stabilized at a central position on shaft 39 by the annular outrigger of the tape reel 31. The crown pulley should have an arcuate profile tape support surface wider than tape being supported so that tape can move across the surface of the pulley, as needed. Neither the reel by itself nor the crown pulley will provide adequate or stable vertical registration for the tape. However, when both work together, a new result is achieved and tape is shifted to a desired elevation without distortion or substantial edge pressure.

Having been adjusted to a desired elevation, a fixed tape guide, with flanges, such as guide 37 feeds tape in a tape span toward a transducer, not shown. The fixed posts 33 and the fixed flange guide 37 are preferably steel pins, while the crown pulley 35 is preferably a nonresilient plastic material with a central bore allowing the right steel axial shaft 39 to extend therethrough and be supported perpendicularly by base 41.

In the present description, only a single tape reel and crown pulley assembly have been shown. However, a typical tape cassette will employ two reels, each having an annular outrigger and an associated crown pulley assembly. One reel would be a tape supply reel, the other reel being a take-up reel, with reels alternating in their roles as tape is reversed. The present invention is not limited to magnetic tape, but may be used for other types of tape and web systems.

We claim:

1. Apparatus for stabilizing a tape path comprising,
   a tape reel having a central hub defining an axial passageway therethrough, a body portion surrounding the hub having an outer, peripheral, cylindrical, tape support surface with a dimension corresponding to a tape width, and an annular outrigger coaxial with said hub and extending below said body portion, said annular outrigger being spaced apart from the hub and from said outer peripheral surface,
   a planar base with an upright pin therein, the axial passageway of said hub fitting closely over the pin in a wheel and axle relation, the annular outrigger contacting the base,
   means associated with said pin for urging said annular outrigger to remain in contact with the base as said reel rotates, and
   a crown pulley with a symmetrical arcuate profile somewhat wider than said tape width and mounted for rotation on said base to receive tape from the reel, said pulley spaced apart from said reel and having an axis about which the pulley turns, the pulley being adapted for up and down axial motion on said axis, whereby said annular outrigger constrains said reel to urge a moving tape toward said crown pulley, thus stabilizing the axial motion of tape along its path, without excessive edge guide contact therewith.

2. The apparatus of claim 1 wherein said reel body has radial ribs extending from said hub to said outer peripheral surface and a central annular rib between the hub and the outer peripheral surface, said central rib extending below said reel body thereby forming said annular outrigger.

3. The apparatus of claim 1 wherein said outer peripheral surface of said reel body includes upper and lower flanged portion spaced apart at the limits of said dimension corresponding to a tape width, said flanged portions extending radially outwardly from said axial passageway to a sufficient dimension for establishing a tape pack.

4. The apparatus of claim 1 wherein said means associated with said pin for urging said outrigger to remain in contact with the base as said reel rotates is a retainer clip.

5. Apparatus for stabilizing a tape path comprising,
   a planar base, at least one tape reel having a central hub and a body portion surrounding the hub having an outer, peripheral, cylindrical tape support surface and having a rotational axis, said tape reel supported by said planar base for axial rotation, outrigger means associated with the tape reel for contacting said base, said outrigger means spaced apart from the hub and from said outer peripheral surface, means urging the tape reel to maintain said outrigger means in contact with the base, and a crown pulley with a symmetrical arcuate profile wider than said tape width and mounted for rotation on said base to receive tape from the reel, said pulley spaced apart from said reel and having an axis about which the pulley turns, the pulley being adapted for up and down axial motion on said axis, whereby said annular outrigger means constrains said reel to urge a moving tape toward said crown pulley in such a manner as to tend to position tape toward the center of its range of axial movement, thus stabilizing the axial motion of tape along its path, without edge guide contact therewith.

6. The appartus of claim 5 wherein radial ribs extend from said hub to said outer peripheral tape support surface and having a central annular rib between the hub and the outer peripheral surface, said central rib extending below said reel body thereby forming said annular outrigger means contacting said base.

7. The apparatus of claim 6 wherein said means for urging the tape reel to maintain said outrigger means in contact with the base is a retainer clip.

* * * * *